Figure 1:
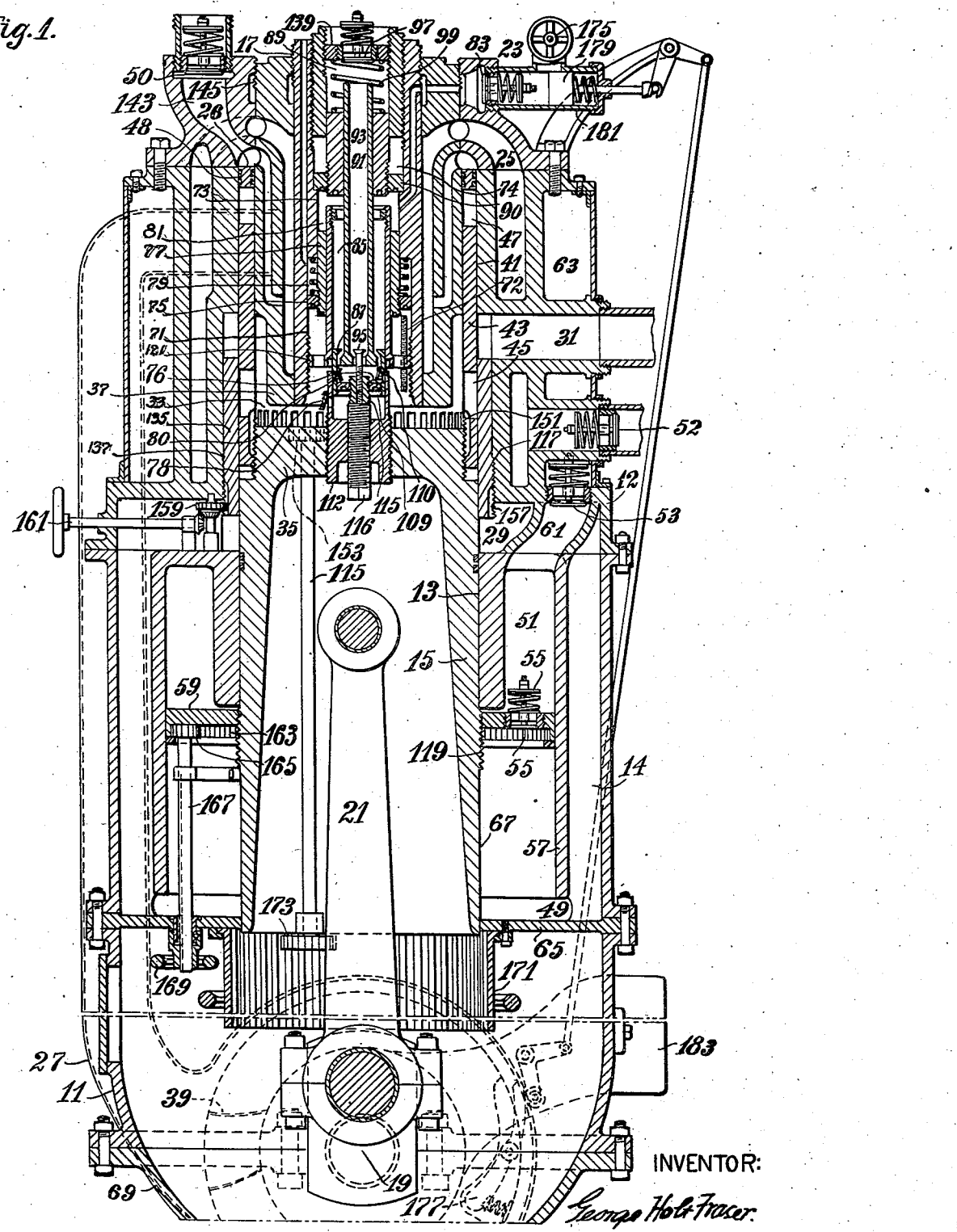

March 3, 1942.   G. H. FRASER   2,274,683
ENGINE
Filed May 18, 1939   2 Sheets-Sheet 2

INVENTOR
George Holt Fraser

Patented Mar. 3, 1942

2,274,683

UNITED STATES PATENT OFFICE 2,274,683

ENGINE

George Holt Fraser, Brooklyn, N. Y.

Application May 18, 1939, Serial No. 274,390

19 Claims. (Cl. 123—74)

This invention relates to internal combustion engines, and aims to provide certain improvements therein especially applicable to such engines of the Diesel type in which a body of air is compressed to raise its temperature sufficiently to ignite the fuel, usually a heavy fuel oil, which is injected into the highly compressed air about the instant of greatest compression.

My invention is applicable to various types of internal combustion engines and is especially applicable to the two cycle type of Diesel engines in which a cylinder having a combustion chamber, means for supplying fuel thereto, and air inlet and exhaust ports, encloses a piston which near the end of its power stroke opens the inlet port from an auxiliary compressor coincidently with a cam operated opening of the exhaust port, for allowing fresh air to run into the cylinder and sweep the exhaust gases therein out through an exhaust port in the cylinder head and to fill said chamber with clean air before the inlet port is closed by the piston and the outlet is closed. The air is then compressed by the return stroke of the piston toward the head of the cylinder sufficiently to increase the temperature enough to burn the fuel which by an auxiliary pump is forced into the cylinder as or after the piston moves to the end of its return stroke, so that the fuel may be ignited by the high temperature of the air and the pressure built up by such ignition confined between the head of the cylinder and the power end of the piston may be used to move the latter on its power stroke, which is transmitted through a crank shaft to a fly wheel capable of reversely reciprocating the piston through its return stroke. In this manner the explosion, scavenging, recharging and air compressing operations required for a Diesel engine are effected within the two cycles covered by its power and return strokes, as a simplification of the four cycles utilized for accomplishing this in earlier four cycle Diesel engines. Introduction of compressed air at the end of the power stroke gained this reduction in cycles, but the latter has been effected by the addition of an auxiliary air compressor in conjunction with a lower air inlet opened and closed by the piston, and these have been used with cam operated exhaust ports and two pressure pumps, each of which was indirectly operated by the engine but involved considerable complications and included numerous running parts.

My present invention aims to simplify such an engine and to accomplish some or all of its advantages by utilizing the reciprocatory movement of the piston itself for directly effecting one or more of said results, and thereby to reduce the number of separately movable parts and the weight and size of the engine, and to increase its efficiency and facilitate its operation.

Objects of the invention are to increase the functions of the piston and to utilize its reciprocation for effecting results formerly effected by separately movable parts.

Other objects are to provide means for deferring admission of an explosive mixture into the cylinder until the crank has passed dead centre, and for deferring ignition of such mixture until the crank is approaching its most effective position, and for adjusting such deference, and for controlling and adjusting such deference relatively to the piston and preferably from without the piston head or without stopping operation.

To this end I utilize the cylinder and the piston themselves as an air compression means for supplying air to the inlet port, and preferably also as a cooling medium circulation means or pump for circulating cooling water against the cylinder; and preferably also as a valve means for opening and closing both the inlet and outlet ports; and preferably also as a pressure means for pressure feeding into the cylinder, and as a supercharger means for super-compressing and injecting an atomizing stream of air into and with said fuel; and preferably also utilize the piston for pumping and controlling said injection; and I preferably also make the cylinder with closed ends, the one having a combustion chamber and the other a compression chamber, and utilize the piston as a reciprocatory partition between said chambers and counter-actingly transmitting through itself counter stresses therein for cushioning and facilitating reversal of reciprocation of the piston itself; and I provide various other features of improvement, all of which will be more fully hereinafter set forth as applied to the two cycle type of Diesel engine shown in the accompanying drawings as illustrating the preferred form of my present improvements and the preferably combined utilization of the various features thereof, in which—

Figure 2:
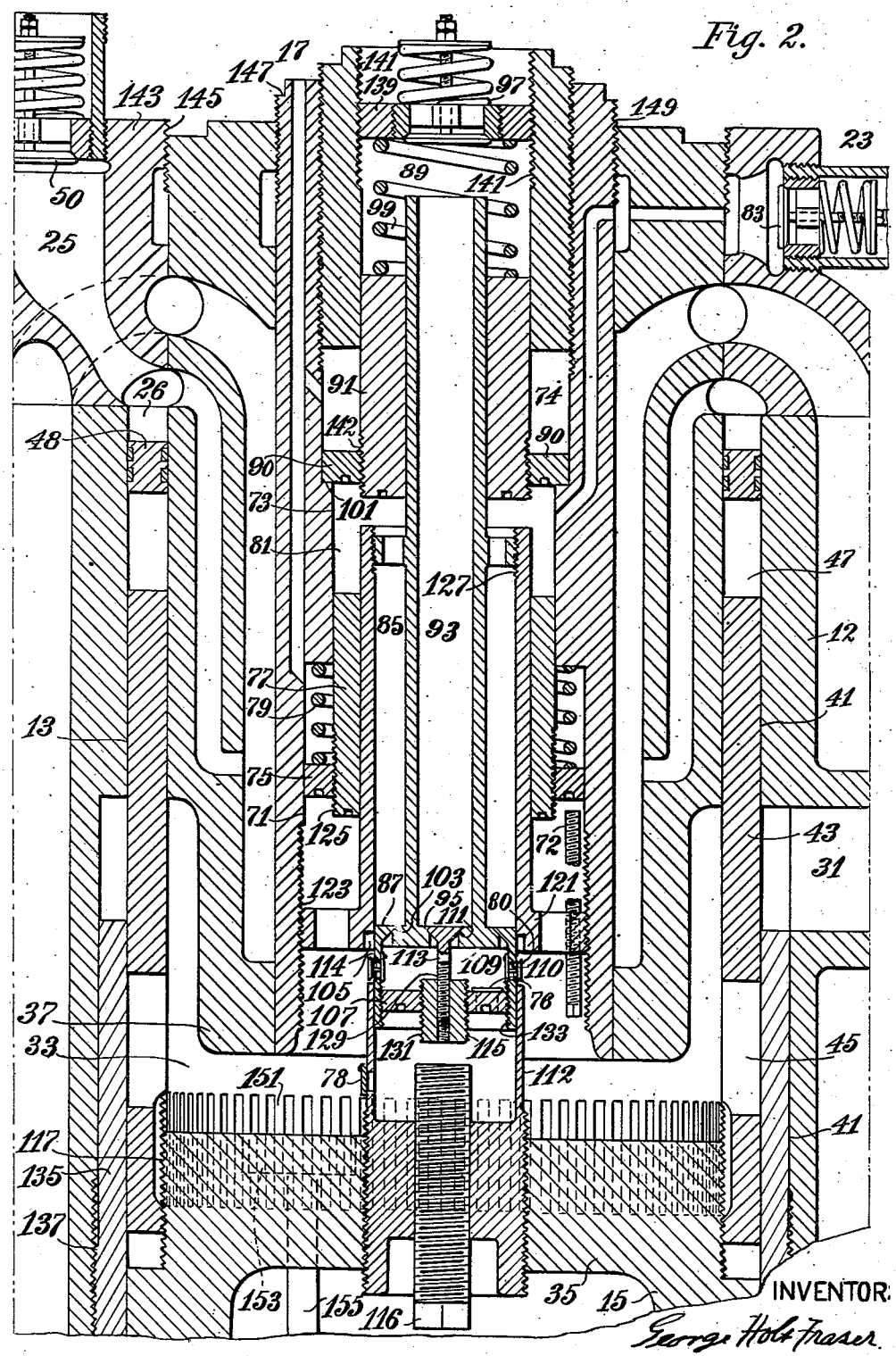

Fig. 1 is a fragmentary vertical transverse section of a single cylinder two cycle Diesel engine embodying the preferred form of my invention, the view being cut through the axis of its cylinder, and Fig. 2 is a fragmentary enlarged similar axial section showing the cylinder head and supply means thereof on a larger scale.

Referring to the drawings let 11 indicate the base or crank case of a Diesel engine, 13 the cylinder thereof, having upper and lower sections 12 and 14, 15 its piston, 17 its fuel feeder, 19 its crank shaft, 21 its pitman connecting the latter and said piston, 23 its air supply system, 25 its cooling system, 27 its heat interchanger and air pre-heater air cooling system, 29 its air inlet port, and 31 its air exhaust port.

These parts may be of any usual or suitable construction for an internal combustion engine of the two cycle type in which the cylinder has a combustion chamber 33 between the cylinder head 35 and the head 37 of the piston and in which the air inlet and outlet ports are opened for scavenging the cylinder when the piston moves toward the end of its power stroke and are closed for compressing the air in the cylinder during the return stroke of the piston.

The air supply system usually comprises air compression means driven from the crank shaft and supplying heated compressed air to the inlet 29, which is closed by the piston 15 except as the latter moves toward the end of its power stroke, whereupon the head of the piston opens the port 29 and permits air to rush therefrom into the combustion chamber 33. The exhaust port 31 is usually cam operated from the crank shaft to open and close the exhaust coincidently with opening and closing of the inlet 29, and permits air therefrom to scavenge the combustion gases during said opening and to fill said chamber with fresh air, which is confined therein upon said closing and thereafter compressed during the return stroke of the piston sufficiently to raise its temperature above the ignition point of the fuel which is introduced into the combustion chamber when the piston completes its return stroke.

The cooling system usually comprises water conduit jackets within the head 35 and around the cylinder 13 and circulation means operated from the crank shaft for circulating water therethrough.

The heat interchanger and air pre-heater means usually comprises a casing surrounding the cooling means and in communication from a blower means 39, rotated from the crank shaft 19 and circulating said air around the cylinder for pre-heating the air and in communication with the air compression means for supplying pre-heated air thereto.

The fuel feeder means 17 usually comprises a cam operated pump timed to inject the fuel charge into the combustion chamber at the position of the piston best suited to utilize the pressure generated by combustion of such fuel for moving the piston on its working stroke and utilizing such movement for rotating the air blower in the fly-wheel 39 sufficiently to cause the latter to return the piston and compress the air confined within the cylinder during the return stroke of the piston according to the well known principle of two cycle operation of a Diesel engine.

Separate or auxiliary driven parts have been used for effecting these several operations and such parts have been indirectly driven from the engine and added to the number and complexity of the mechanism of a two cycle Diesel engine.

My invention aims to effect one or more of said results with fewer and simpler parts and to provide for more directly operating any of such parts, and for incorporating them within the essential features of the engine itself, and to utilize the cylinder and piston of the engine for effecting results formerly effected by collateral equipment or attachments.

To this end I provide various features of improvement, which, in their preferably combined form shown in the accompanying drawings, I will now describe in detail.

According to one feature of improvement I provide the cylinder itself with an axially spaced inlet port 29 and an exhaust port 31 opening through its inner periphery, and axially extend such periphery as a valve seat 41 between and beyond said ports as a valve seat therefor, and I provide the piston 15 with an axially extended valve or wall portion 43 coincident with its outer periphery and cooperating with the inner periphery of the cylinder between said ports and extended beyond the port 31. Through this extension I provide the piston with an air inlet port 45 movable into communication with and opening the air ports 29, and with a gas exhaust port 47 communicating with and opening the exhaust port 31 as the piston moves toward the end of its power stroke, and simultaneously moving out of coincidence with and closing said ports 29 and 31 during the other reciprocation of the piston, in such manner that during its movement the piston itself simultaneously opens and closes both its compressed air inlet and gas discharge outlet communications, as distinguished from the former constructions in which the cylinder end of the piston successively opened these, or merely opened and closed the compressed air inlet to it, and a cam operated exhaust valve controlled the gas outlet from it.

According to another feature of improvement I preferably make the valve portion 43 as a cylindrical annular wall on or of the head 35 of the piston 15 and extended around and above the explosion chamber 33 in such manner that it radially encloses the latter and radially resists pressure therein, to permit which I preferably provide the outer end of the cylinder 13 with an inwardly extended head 37 having a cylindrical outer periphery spaced inwardly from the inner periphery of the cylinder, and slidably fitted within and engaging the inner periphery of the valve portion 43 of the piston in such manner that the combustion chamber 33 is completely enclosed between the head 37 and the annular valve 43 and the head 35 of the piston throughout reciprocatory movements of the latter and the effective superficial area of the piston is that defined by the inner periphery of the valve 43. This minimum volume is defined by the inner end of the head 37, which preferably projects inwardly of the exhaust port 31, but has a slightly recessed end opposite the latter and affording communication therewith through the piston exhaust port 47 when this is moved into coincidence with the port 31, above which the valve 43, in any suitable manner, makes a leak tight sliding joint with the outer periphery of the head 37 and the inner periphery of the cylinder 13 for resisting leakage from or into the chamber 33.

According to another feature of improvement I preferably utilize the cylinder 13 and piston 15 themselves as the means for circulating water through the cooling system 25, preferably by utilizing the space within the cylinder and around its head 37 as part of an annular pumping chamber 26 in communication with said system. The upper end of the valve 43 has an annular pumping plunger or piston 48 reciprocating in said chamber, and by providing the latter with suction and discharge valves 50 and 52 for making the pumping action incident to reciprocation of the piston effect circulation of pumped fluid through the cooling system, which latter preferably extends downwardly and upwardly within the cylinder head 37 and then down around the cylinder 13 to and terminates in a water outlet 52.

As usual the cylindrical periphery of the cup-shaped lower extension of the piston 15 slides across and opens and closes the air inlet 29 and makes a sliding closure with and is guided by the bore of the cylinder therebelow, but according to another feature of my invention I provide the cylinder itself with an air compression chamber 49, and the piston itself with an air compressing plunger 59 in said chamber and reciprocating therein coincidently with and in response to reciprocation of the piston, and I provide these with a suction valve 53 in communication with the heat interchanger 27 and with a discharge valve 55 in communication with the inlet 29 when supplying preheated compressed air thereto, in such manner that as the piston moves on its power stroke the air below it wil be compressed around the inlet 29 until the port 45 opens this inlet and the port 47 opens the discharge 31. This opening will permit this compressed air to rush in and scavenge and escape from the chamber 33 while said ports are opened, which air will be confined in said chamber as soon as said ports are closed, and may then be compressed to raise its temperature as desired during the return movement of the piston, being then confined in the combustion chamber by the annular wall or valve 43 of the piston.

In this manner compression of the air is directly effected by the cylinder and piston and the stress of such compression is confined within them, for accomplishing which the lower end of the cylinder is preferably closed with a lower head or wall 65 and the lower end of the piston 13 is formed with a cylindrical cup-shaped extension 67, the outer periphery of which fits slidingly in and makes a leak tight joint with the inner periphery of the head 65 and serves as an inner wall for the cylinder 57 of the chamber 49, making the latter an annular pressure chamber opposed to the explosion chamber 33. The plunger 59 is a pressure piston opposed to the working head 35 of the piston, in such manner that as the piston 15 is moved during its working stroke the plunger 59 generates in the cylinder 57, a pressure counter to that in the chamber 33, which counter pressure tends to cushion the termination of the working stroke of the piston until the counter pressure is relieved by the opening of the inlet 29, which together with the valve 55 permits return movement of the piston without pressure resistance from the plunger 59. In such construction the extent of such counter pressure must be determined by the volume of the chamber 49 and by proportioning its inner and outer diameters to accord with the air compression desired and to suit the superficial area of the piston head defined by the inner periphery of its valve 43. The volume of the air chamber 49 constitutes part of the volume of the cylinder 57 in the construction shown and correspondingly modifies the cushioning and counter effect of the air pump, which is powered by revolution of the crank shaft, so that all proportions should be modified and suited to the desired conditions of use and operation. In the construction shown the piston extension 67 is hollow and encircles the pitman 21, which is connected to the piston 15 above the plunger 59, carried by and shown as formed around and as a part of the piston, and as encircled by the open lower end of the cylinder, which is shown as in communication with and encircled by the inlet 29. The latter is shown as an integral part of the cylinder and as mounted on its lower head 65, which is shown as mounted on and covering the crank case 11, which is shown as closed at its bottom by a cover 69, when used with the single acting engine shown.

When constructed as shown the piston 15 is substantially H-shaped in axial cross-section, having opposed cup shaped ends, as the valve 43 and the extension 67, communication between which is partitioned by the head 35, which serves as a movable partition between the gas combustion chamber 33 and the air compression chamber 49. The piston utilizes the major part of its working stroke for turning the crank shaft and moderately compressing the scavenging air below its plunger 59 and sucking in additional air above said plunger through the valve 53, and the last of said stroke for scavenging and air charging the combustion chamber when it opens the ports 29 and 31, and is moved through its return stroke by the crank shaft 19, and utilizes its return stroke for closing these ports and compressing the air thereby confined in the combustion chamber 33.

In this construction the end 48 of the piston during its working stroke draws cool water into the chamber 26, and during its return stroke pumps this water through the cooling system 25.

According to another feature of improvement I preferably utilize the pressure within the combustion chamber 33 for feeding into this chamber the combustible fuel and an atomizing superheated jet of air as a super-charged mixture best suited to ignition by the high temperature of the air compressed within the combustion chamber by movement of the piston toward the end of its return stroke, and I utilize the return movement of the piston to effect and time and control such introduction, and provide means for adjusting or varying such timing to suit desired conditions. This may be accomplished in any suitable manner, but preferably for this purpose I provide in the cylinder head 37 a relatively large low pressure cylinder 71 in communication with a relatively small high pressure cylinder 73 and partitioned from the latter by a relatively large gas operated piston 75 in communication with the chamber 33 and carrying a relatively small super-pressure piston 77, which pistons move together axially in said cylinders respectively with variations in the pressure within the chamber 33, which pressure by acting against the large area of the piston 75 moves this and the smaller piston 77 upwardly against the tension of a spring 79 tending to move them downwardly, in such manner that these pistons move outwardly together in response to the pressure in the chamber 33, and are moved inwardly by the spring 79 in the upper end of the cylinder 71, which end is in communication with the outer air to facilitate such movement, and stopped by a screw 72.

The cylinder 73 is elongated and provided with a lower oil chamber 81 in communication with the fuel supply 23 through a suction valve 83, and the piston 77 reciprocates in and acts as an oil pump plunger for this oil chamber 81, in such manner that when the piston 77 descends it will cause a charge of oil to be sucked in to the cylinder 81 and when said piston ascends it will exert against said charge a pressure superior to that of the gas in the cylinder 71 determined by the difference in superficial area between the piston 75 and the piston 77, which super-pressure I utilize for forcing the oil from the chamber 81 into the explosion chamber 33 under a pressure exceeding that in the latter, by providing a communication therebetween, as by an oil inlet duct 85, through which oil may be forced from the chamber 81 into the chamber 33, which duct is preferably controlled by an oil discharge valve 87, the oil suction valve 83, oil chamber 81, oil discharge valve 87, and piston 77, being so limited that they constitute a high pressure oil pump of which the piston 77 is the plunger which is pressure operated by the pressure in the chamber 33 and is suction operated by the spring 79, and the discharge pressure of which is determined by the relative diameters of the plunger 75 and the piston 77.

This construction alone suffices for super-pressure injection of fuel into the chamber 33, but according to another feature of improvement I preferably provide for simultaneously injecting super-heated compressed air with the fuel, and this I preferably accomplish by making the high pressure cylinder 73 with a slightly larger upper cylinder 74 and with a materially smaller compressed air cylinder 89, and partitioning this from the oil chamber 81 by a movable partition comprising a large piston 90 and smaller plunger 91 affording a movable top for the chamber 81 and a movable bottom for the chamber 89 and moved upwardly by and as the plunger 77 raises the body of non-compressible fluid in the oil chamber, for compressing air in the chamber 89 through the medium of the pushed up oil and with the same pressure as the latter is pushed up, and for compressing said air to the extent necessary to super-heat it as much as desired prior to its discharge into the chamber 33, for effecting which discharge the air chamber 89 is in communication with the chamber 33, as shown by the compressed air duct 93 having a discharge valve 95. The air inlet suction valve 97 in the head of the chamber 89, and a spring 99 above and depressing the plunger 91 serve to make the latter and the chamber 89 a compressed air pump, which should be proportioned to suit the compression desired for the desired pre-heating and super-pressure of the air to be jetted into the chamber 33, for which compression the relative proportions of the plungers 77 and 89 and the springs 79 and 99 should be suited.

This construction suffices for introduction into the chamber 33 of compressed and pre-heated air where mere super-charging with these is desired, but according to another feature of my invention I prefer to simultaneously inject the fuel and the compressed air and utilize the latter for atomizing the former during such injection for which any suitable communication and atomizing means may be employed, but according to another feature of my invention I preferably make the piston 75 and plungers 77 and 91 annular and dispose the oil discharge duct 85 concentrically inwardly of the piston 75 and the air duct 93 concentrically within the oil duct and extended through the plunger 91, in such manner that the oil duct 85 extends through and affords a cylindrical inner wall for the low pressure cylinder 71 and a closure between the latter and the oil chamber 81, and is slidably encircled by the high pressure piston 77, inwardly of and past which and past the low pressure cylinder 71 it conducts fuel under pressure from the oil cylinder 81 to the oil discharge valve 87, and the air duct 93 as a tube extending through and affording an inner well for the oil duct 85 and the oil chamber 81, and through the super-compression plunger 91 into the super-pressure chamber 89, within which it fits through and is slidably encircled by the plunger 91, which latter thereby makes a closure between the oil chamber 81 and the super- chamber 89, from which the air duct 93 communicates concentrically inwardly of the oil duct 85 with the air discharge valve 95. This construction permits the pistons 75 and 77 to move on the oil duct 85, and the plunger 91 to move on the air duct 93 up and down with each other or relatively, downward movement of the plunger 91 being arrested by a stop or shoulder 101 between the larger diameter of the chamber 89 and the small diameter of the chamber 81, and serving to force oil from the oil chamber 81 through the oil duct 85 when the oil discharge valve 87 is open. The plunger 91 is raised by elevation by the high pressure plunger 77 of the oil in the chamber 81 through which it transmits high pressure through the piston 90 to the plunger 91, which by reason of its smaller diameter increases this high pressure to super-pressure which it transmits to the air in the chamber 89, so that the pressure in the latter will be super to that in the oil chamber, and the pressures in both of these will be super to that in the low pressure chamber 71 and the combustion chamber 33, and the air may atomize and outwardly blow the oil without danger of counter flow of the latter into the air duct.

According to another feature of improvement my invention preferably makes the fuel discharge valve 87 annular and around the air discharge valve 95 in such manner that the air will outflow toward and intermingle with and outwardly atomize the fuel, preferably by making the valve 87 with downwardly and outwardly extended annular seats 103, the one shown as formed on the outer periphery of the end of the air duct 93 and the other as a ring formed on the inner periphery of an inverted cup-shaped member 105, the outer periphery of which is cylindrical and slidably fitted in the cylindrical lower end of the oil duct 85, and is perforated by circumferentially spaced outlets below the seats 103, which cup has a closed bottom wall or partition 107 spaced below and extended across the lower ends of the oil and air ducts and affording there below a mixing chamber 109 for mixing the air and fuel as the latter is atomized and the mixture is jetted from the cup 105 into the chamber 33, and by making the air discharge valve 95 with downwardly and inwardly extended annular valve seats 111 concentrically inwardly of the oil seats 103. These are shown as annular segments or frustrums of inverted cones of which seats 111 one is preferably formed on the inner periphery of the lower end of the air duct 93 and the other is preferably formed as an enlargement of the upper end of a pin 113 carried by and movable with the cup 105 in such manner that the air and oil valves will be simultaneously opened and closed by and coincidently with movement of the member 105 for simultaneously introducing air and oil into its chamber 109.

The oil and air introduction valves may be moved in any suitable manner, but according to another feature of my invention I prefer to move them from and by and in response to movement of the piston toward the end of its return stroke, for which purpose I preferably provide the cup 105 with an operator means or projection 115 extended into the path of and engaged and operated by an operator screw 116 carried by the head 35 of the piston 15, in such manner that near the end of its return stroke such head will lift the cup 105 and open the valves 87 and 95, to permit discharge from these into the chamber 33 until the piston 15 begins to move on its working stroke, which movement will permit descent of the member 105 and closure of said valves in such manner that movement of the piston directly effects and times opening and closing of the fuel and super-charger valves, which are protected from cylinder pressure operation by one or more check valves 76 and 78, and 80.

According to another feature of improvement my invention preferably retains the fuel charge as a non-explosive mixture in the mixing chamber 109 until the piston 15 has moved more or less beyond the dead center on its working stroke, and defers admission of such mixture into and its ignition in the cylinder until the resulting explosion may act against the piston when the crank is moved toward a relatively effective position for transmitting force of such explosion to the crank shaft.

This may be accomplished in any suitable manner, but preferably I accomplish it by providing the mixing chamber 109 with outlet ports 110, and the pison head 35 with an annular timing valve 112 around and slidable across and closing these ports before the piston starts moving on its working stroke, and passing below and opening these ports as the piston progresses on its working stroke and at such point in such progress as it is desired that said mixture shall be released into and ignited in the cylinder.

As shown the valve 112 has a cup-shaped or hollow upper end around and sliding over and closing the ports 110 in the oil valve 87 as the piston approaches toward the end of its return stroke, and sliding below and opening these ports during an earlier portion of the movement of the piston on its working stroke, and is carried by and reciprocates with the piston, and carries the operating screw 116 for opening the oil and air valves, discharge from which is confined in the mixing chamber 109 until the valve 112 moves downwardly on its working stroke sufficiently to open the ports 110 and permit this mixture to enter the combustion chamber 33 and combine with the compressed air therein sufficiently to form an explosive combustible mixture which can be ignited by the temperature of this compressed air.

For timing the resulting explosion the ports 110 and valve 112 may be initially disposed where desired, but according to another feature of improvement my invention provides for adjusting this timing to vary its relation to the position of the piston, preferably from without the cylinder and during operation, by axially adjusting the plug 147 carrying the oil valve 87 more or less toward the valve 112, and preferably when operation is stopped by axially adjusting the valve 112 relatively to the valve 87, to permit which from below the piston head 35 the valve 112 is preferably screwed through the latter so that it may be adjusted therein from therebelow, for by such adjustment varying its position relatively to the working stroke of the piston at which it will open the ports 110.

For adjusting the valve operator screw 116 it is preferably adjustably connected to the piston head 35, and as shown is extended through the latter so that it may be adjusted from therebelow without opening the cylinder.

Preferably the valve operator 116 is screwed through the timing valve 112, so that when the latter is adjusted to defer the explosion of the charge the valve operator 116 may be relatively adjusted to time opening of the air and oil valves as desired for any position of the timing valve 112, to permit upward adjustment of which for delayed timing the flange 121 of the oil duct 85 is preferably formed with a recess 114 into which the upper end of the valve 112 may be moved upwardly for delayed timing.

Suction closing of the valves 87 and 95 by descent of the valve 112 is facilitated by the valve 76, and pressure opening of said valves by ascent of the valve 112 is avoided, by a check valve 78.

According to another feature my invention preferably provides for relatively adjusting the various co-operative elements of the engine in such manner that the operator may vary these to suit particular conditions, preferably in the following respects:

For adjusting the piston valve 43 relatively to the piston 15 these parts are preferably axially adjustably connected by a screw threaded connection 117 whereby timing of the scavenging may be varied.

For adjusting the air plunger 59 relatively to the piston 15 these parts are preferably axially adjustably connected by a screw threaded connection 119 whereby the compression of scavenging air and the extent of its cushioning counter resistance to the working stroke may be varied and timed.

By making the oil duct 85 with an apertured flange 121 axially adjustably connected with the cylinder head 37 by a screw thread 123 in such manner that it serves as an auxiliary axially adjustable head for the chamber 33 and can be adjusted toward and from the latter for varying it for its fuel reception portion relatively to the piston 15, or for varying the oil discharge valve 87 relatively to and the timing of its operation by said piston. By making the low pressure piston 75 and high pressure piston 77 relatively axially adjustable by connecting them by a screw thread 125, for varying the volume of the oil chamber 81 and adjusting the quantity of oil sucked therein for each charge by descent of the piston 77 and thereby varying the speed and power of the engine.

By making the air duct 93 and its discharge valve 95 axially adjustable relatively to the oil duct 85 and its discharge valve 87, by making the air duct with an apertured peripheral flange and axially adjustably connecting it with the oil duct by a screw thread 127 in such manner that this valve may be adjusted axially relatively to the oil discharge valve 87 for effecting simultaneous opening and closing of these.

By making the air discharge valve 95 axially adjustable relatively to the oil discharge valve 87, by axially adjustably connecting it with the cup 105 by a screw thread 129 in such manner that these valves can be synchronized as desired.

By making the operator means or screw 115 axially adjustable relatively to the partition 105 and the valves 87 and 95 as by axially adjustably connecting it with the cup 105 by screw threads 131, in such manner that the operator 115 can be adjusted more or less into the path of the piston 15 for varying and timing the simultaneous operation of the valves 87 and 95 by the latter.

By making the ring 105 of the oil discharge valve 87 axially adjustable relatively to the mixing chamber 109 for varying the volume of the latter and the size of the apertures therearound by axially adjustably connecting the ring 105 with the partition 107 by screw threads 133 in such manner that the partition can be varied relatively to said discharge valves and to the chamber 33.

By making the air port 29 or exhaust port 31, or both, relatively adjustable and vertically adjustable relatively to the cylinder 13 for vertically varying the time of opening said ports by the air port 45, and gas port 47, preferably by making the upper side of the air port 29 as a ring 135 vertically adjustably connected to the cylinder 13 by a screw thread 137, and extended to and as the lower side of the exhaust port 31, for relatively varying said ports.

By making the super-charger chamber 89 volumetrically variable by making its valved head 139 vertically adjustable by screwing it into said chamber by a screw thread 141 to the end that it may vary the compression and the resultant temperature of the air below it, and by making the plunger 91 vertically adjustable in the piston 90 as by a screw connection 142 therebetween.

By making the cylinder head 37 axially adjustable relatively to the piston head 35, as by making the head 37 as an annular casting adjustable through the cylinder cap 143 and connecting it with the latter by a screw 145, and by movably adjustably connecting the head 37 and the feeding means by enclosing the latter in an annular cage 147 and connecting this cage with the head by a screw thread 149.

Any suitable means for operating any of these adjustment provisions may be employed, but I prefer to remove the cylinder head 37 for adjustment of the feeding mechanism carried by it, and during such removal to adjust the valve 43 without removing the piston 15, and according to another feature of improvement I prefer to disconnect and lift the cylinder 13 from the piston 15 for adjusting the inlet port ring 135 or the plunger 59 when the engine is dismantled.

According to another feature of improvement my invention preferably provides for adjusting the piston valve 43 without opening the cylinder 13, for accomplishing which I preferably provide the valve 43 with internal teeth 151 meshing with a pinion 153 mounted in the head 35 of the piston and carried by a shaft 155 depended through this head into and through and accessible adjacent the lower open end of the piston 15 and inwardly of the crank case 11 in such manner that by its lower end this shaft may be turned when the engine is stopped, for rotating the valve 43 for screwing the latter axially of the piston 15.

According to another feature of improvement my invention preferably provides for adjusting the ring 135 for the air inlet 29 during operation of the engine, for which purpose I preferably provide the ring 135 with peripheral teeth 157 slidably meshing with a pinion 159 rotated by a shaft 161 extended through and rotatable from without the cylinder case in such manner that the ring 135 can be screwed up or down to vary the effective height of the air inlet 29 and exhaust port 31 during operation of the engine.

According to another feature of improvement my invention provides for varying the plunger 59 during operation of the engine, for which purpose I preferably provide it with a shouldered toothed rack 163, meshing with and carrying a pinion 165, carried by and from which is depended a splined shaft 167 extended and vertically movable through the bottom wall 65 of the cylinder and through a hand wheel 169 in vertically fixed relation to and revolubly mounted under said wall by which wheel said shaft can be turned to screw the plunger 59 axially of the piston as the shaft 167 reciprocates with the piston and is moved vertically with adjustment of the plunger for varying the compression below the latter.

According to another feature of improvement my invention provides for varying the valve 43 during operation of the engine, for which purpose I preferably provide an axially extended internally toothed annular hand wheel 171 revolubly depended from the bottom wall 65 around and a distance equalling the stroke of the piston therebelow, and slidably engaged during said stroke by the teeth of a pinion 173 in operative relation to and for turning the valve 43 when the wheel 171 is turned without stopping reciprocation of the piston.

To provide for similarly adjusting the valve 43 without requiring removal of the piston head 37 I preferably also provide the valve 43 with internal teeth 151 in mesh with a pinion 153, which is rotated by a shaft 155 extended through the head 35 and the hollow lower end of the piston and accessible below the latter for rotation from within the crank case.

My invention contemplates governing the speed and performance of the engine in the construction shown by regulating the amount of each fuel charge by axial adjustment of the plunger 77 relatively to the piston 75, which adjustment if upward will diminish said charge, and if downward will increase it, with each stroke of said plunger, and it contemplates adjustment of the supply subject to such pumping action of the plunger by manual adjustment of an ordinary fuel supply valve 175, and utilizing closing of this valve for stopping the engine, to the end that when adjusted as desired operation of the engine may be controlled by a single hand valve, which is open to permit starting, set for the desired fuel consumption during operation, and closed for stopping operation. Opening such valve for starting fills the oil chamber 81, in which it serves when the fly-wheel 39 is turned by hand or otherwise for effecting a starting pressure, to raise the plunger 91 for super-pressing the air above it to ignition temperature and greater pressure than that of the air pressed in the cylinder by the rise of the piston 15, in such manner that as the latter opens the valves 87 and 95 an initial charge will be atomized into and ignited in the chamber 33 and start the first working stroke and revolution of the fly-wheel 39 with sufficient momentum to effect return stroke of the piston 15 and cause the engine to continue to operate.

If centrifugal governing of the speed of operation of the engine is desired with such hand valve control, the latter may be supplemented by any desired centrifugal governing means, for illustrating one application of which I have shown a spring resisted centrifugal weight 177 on the fly-wheel 39 more or less operating a feed valve 179 counter to a spring 181 preceding the suction oil valve 83 and arranged to be moved more or less by the position of the weight 177 with each revolution of the latter and thereby at each revolution permit a variably controlled passage of oil from the hand valve 175 to the suction valve 83, and thus decrease such supply with increase in speed of the engine and increase such supply with decrease in such speed.

Where desired or required suitable packing rings or leak resistant provisions, and any desired number of valves and ports may be used, and the latter may be circumferentially spaced, or circumferentially extended for avoiding unbalanced loads and facilitating communication with or through them, according to any usual practice in such devices, and any desired sectionalizing of the cylinder piston or other appropriate parts may be employed for convenience or economy in manufacture or manipulation, and any desired number of pistons, cylinders, cranks and their co-operative parts shown may be employed according to any usual practice or co-operative arrangement.

In operation with the construction shown the engine will be started by opening the hand valve 175 and turning the fly-wheel 39 until the air in the chamber 33 is sufficiently compressed to raise its temperature to the ignition point desired for the fuel used. This pressure will cause the plunger 77 to exert a greater pressure against the fuel in the oil chamber 81 and simultaneously raise the plunger 91 and cause it to compress to a greater pressure the air of the super-charger chamber 89. As the piston 15 approaches the end of its upward stroke it will simultaneously open the oil valve 87 and air valve 95, which would permit oil under said greater pressure and air under said super-pressure to escape and mix in the mixing chamber 109 and be atomized and discharged therefrom into the explosion chamber 33, in which the mixture will be ignited by the heat of the air therein, and the pressure generated by such ignition will force the piston 15 on its working stroke and will be confined within the valve 43, which latter toward the end of the working stroke will bring its ports 45 and 47 into coincidence with the ports 29 and 31 for permitting entrance of air and to exhaust gas from the combustion chamber 33.

As the piston descends its plunger 59 may compress air below it and cushion the piston on the working stroke of the piston until the inlet 29 is opened for permitting such air to inrush into the chamber 33 until the return stroke of the piston again closes the inlet 29, during which return stroke the valve 55 and the plunger 59 will permit heated air below the valve 53 to pass into the compression cylinder 57. These operations will be successively repeated with each working stroke of a two cycle engine. Simultaneously with the working stroke of the piston 15 its plunger 48 will draw water into the water cylinder 26 and will expel it therefrom during the return stroke of the piston, thus circulating the cooling fluid around the cylinder.

The usual vane fly-wheel blower 39 commonly used with an air cooled engine will draw outer air through any suitable form of air filter 183 and blow the filtered air therefrom into the air system 27 into the heat interchanger chamber 63 in which it will be pre-heated and from which it will pass to the suction conduit 61 and suction valve 53 through which it will be drawn into the cylinder 57 by descent of the plunger 59 through the valve 55 of which it will pass below this plunger as the latter rises. As the plunger 59 descends this air will be compressed in the chamber 49 communicating with the air inlet 29 to the extent and at the temperature desired for scavenging and air charging the chamber 33, which extent will be varied by adjusting the plunger 59 to vary the volume of the chamber 49, and which scavenging will be varied by adjusting the inlet 29 or the valve 43, or both of these, which in the construction shown may be effected from without the cylinder 13 and piston 15 without separating these or stopping operation.

With a suitable fly-wheel for enforcing its return stroke the engine shown may be used as a complete power unit without dependence on complementary units for circumferentially successive power strokes during the cycle, or it may constitute one of a plurality of such units in any suitable co-operative relation thereof.

It will be seen that my invention provides improvements which can be availed of in whole or in part, and it will be understood that the invention is not limited to the particular details of construction, arrangement, relative proportions, or combination of features set forth as illustrating its preferred form, since it can be availed of in whole or in part according to such modifications of any of these as circumstances, or the judgment of those skilled in the art, may dictate, without departing from the spirit of the invention.

Although set forth and applied to an internal combustion engine of the Diesel type it will be understood that my invention is not limited to use with engines of that type, and that it contemplates using its improved features with any type of engine to which they are applicable respectively, and with any type of engine operated by ignition or explosion of a combustible charge therein, whether such ignition is effected by heat generated therein or by any usual ignition means.

Ceramic or heat resistant materials are preferably used for constructing the feeder plug and parts, the air and oil valves and the tubular timing valve, and the sizes and relative proportions and movements of these and other parts of the engine should be those best suited to circumstances, those shown being magnified for clearness.

Although for the purpose of illustrating the improvements claimed herein I have illustrated them in connection with my improved feeder and supply means for introducing fuel and compressed air into the combustion chamber and my improved means for operating said feeder and supply means, these feeder and supply means improvements are not specifically claimed herein, being claimed in my companion application filed as a division hereof on February 4, 1942, Serial No. 429,530.

What I claim is:

1. In an internal combustion engine, a cylinder having means supplying fuel thereto and having axially spaced radially outwardly extended inlet and outlet ports, and a combustion chamber therebetween; in combination with a piston reciprocating in said cylinder and having an axially extended cylindrical portion having axially spaced inlet and outlet ports radially outwardly extended through said portion and movable into and out of cooperative relation with said ports respectively, and constructed and arranged to open said ports and afford communication therewith through said portion of the piston when the latter moves toward the end of its power stroke, and to close said ports and terminate said communication during counter movement of said piston.

2. In the internal combustion engine specified in claim 1, said piston having a cup-shaped portion reciprocatory within said cylinder and having said inlet and outlet ports through said cup shaped portion and having intermediate said ports a valve portion closing said first inlet and outlet ports intermediate said communication.

3. In the internal combustion engine specified in claim 1, said piston having a hollow cylindrical portion around and extended axially of said explosion chamber, and having said inlet and outlet ports through said extended portion, and having axially beyond said ports a valve portion controlling communication through said outlet ports.

4. In the internal combustion engine specified in claim 1, said cylinder having an inwardly spaced and axially extended male head inwardly of its ports and opposed to said piston, and said piston having an axially extended female portion intersected by its ports and around and in reciprocatory engagement with said head and around and affording a closed chamber between the latter and said piston.

5. In an internal combustion engine, a cylinder having means supplying fuel thereto and inlet and outlet ports, and a combustion chamber in communication therewith, a piston reciprocating in and generating an air pressure within said cylinder, means controlling said ports during said reciprocation, means effecting ignition of said fuel in said chamber, and air compression means introducing air under pressure into said chamber approximate said ignition; the combination therewith of an axially adjustable compressed air inlet in communication between said air compression means and said combustion chamber, axially adjustable relatively to the latter and axially varying said introduction relatively thereto.

6. In the internal combustion engine specified in claim 5, said air inlet being concentric of and axially adjustable within said combustion chamber during operation of said engine.

7. In an internal combustion engine, a cylinder having means supplying fuel thereto and inlet and outlet ports and a combustion chamber, one of said ports being adjustable axially of said cylinder, a piston reciprocating in said cylinder and having means opening and closing one of said ports during said reciprocation, and means effecting ignition of said fuel; the combination therewith of means axially adjusting one of said adjustable ports.

8. In the internal combustion engine specified in claim 7, said adjustment means axially adjusting said adjustable port during the operation of said engine.

9. In an internal combustion engine, a cylinder having means supplying fuel thereto and inlet and outlet ports and a combustion chamber, a piston reciprocating in said cylinder and having means adjustable axially of said piston and opening and closing one of said ports during said reciprocation, and means effecting ignition of said fuel; the combination therewith of means axially adjusting said opening and closing means of said piston.

10. In the internal combustion engine specified in claim 9, said opening and closing means of said piston being axially adjustable during operation of said engine.

11. In an internal combustion engine, a cylinder having means supplying fuel thereto and inlet and outlet ports and a combustion chamber, a piston reciprocating in said cylinder, means opening and closing said ports during said reciprocation, and ignition means igniting said fuel approximate its introduction; the combination therewith of axially adjustable air compression means adjustable axially of and operated by and in response to reciprocation of said piston and in communication with and supplying compressed air to said inlet port, and means axially adjusting said compression means relatively to said piston and varying said supply.

12. In the internal combustion engine specified in claim 11, said compression means being axially adjustable relatively to said piston during operation of said engine.

13. In the internal combustion engine specified in claim 11, said compression means including a plunger reciprocatory with and screwable axially and adjustably connected to the piston.

14. In an internal combustion engine, a cylinder having means supplying fuel thereto and inlet and outlet ports and a combustion chamber, and a heat interchanger circulatory system around said cylinder, a piston reciprocating in said cylinder, means opening and closing said ports during said reciprocation, and means effecting ignition of said fuel; in combination with an axially variable pump means in communication with and pumping fluid through said system, variable axially of and operated by said piston coincidently with and in response to said reciprocation, and axially and adjustably relatively to and from said piston varying said circulation.

15. In the internal combustion engine specified in claim 14, said circulation means being axially adjustable relatively to said piston during operation of said engine and axially and adjustably controlling said heat interchanging during said operation.

16. In an internal combustion engine, a cylinder having means supplying fuel thereto and air inlet and gas exhaust ports and a combustion chamber, a piston reciprocating in said cylinder, means controlling said ports, means effecting ignition of said fuel, and air compression means in communication with and supplying heated compressed air to said air port; the combination therewith of a volumetrically variable compression chamber between and in operative relation to said compression means and said inlet port and volumetrically and adjustably varying the compression and heating of said air therebetween, and means volumetrically varying said compression chamber.

17. In the internal combustion engine specified in claim 16, said compression chamber being volumetrically and variably adjustable axially of said cylinder.

18. In the internal combustion engine specified in claim 16, said compression chamber being volumetrically variable during operation of said engine.

19. In an internal combustion engine, a cylinder having means supplying fuel thereto and inlet and outlet ports and a combustion chamber, and an air cooling conduit around said cylinder, a piston reciprocating in said cylinder, means opening and closing said ports during said reciprocation, and means effecting ignition of said fuel; the combination therewith of a reciprocatory air pump means reciprocatory with and reciprocated by said piston and in communication with and pumping air through said cooling means coincidentally with and in response to reciprocation of said piston.

GEORGE HOLT FRASER.